US012762648B2

(12) United States Patent
McGough, Jr. et al.

(10) Patent No.: US 12,762,648 B2
(45) **Date of Patent: *Oct. 13, 2026**

(54) DEEP ZOOM IMAGE GENERATION SYSTEMS AND METHODS WITH TRANSIENT RENDITION STORAGE

(71) Applicant: OPEN TEXT CORPORATION, Waterlo (CA)

(72) Inventors: David John McGough, Jr., Westerville, OH (US); Srikanth Paladugula, Hyderabad (IN); Vadim Frounze, Bowmanville (CA)

(73) Assignee: OPEN TEXT CORPORATION, Waterloo (CA)

(*) Notice: Subject to any disclaimer, the term of this patent is extended or adjusted under 35 U.S.C. 154(b) by 151 days.

This patent is subject to a terminal disclaimer.

(21) Appl. No.: 18/800,997

(22) Filed: Aug. 12, 2024

(65) Prior Publication Data

US 2024/0404008 A1 Dec. 5, 2024

Related U.S. Application Data

(63) Continuation of application No. 17/721,118, filed on Apr. 14, 2022, now Pat. No. 12,073,532.

(30) Foreign Application Priority Data

Oct. 29, 2021 (IN) ............................ 202141049727

(51) Int. Cl.

*G06T 3/4092* (2024.01)
*G06F 16/51* (2019.01)

(52) U.S. Cl.

CPC ............ *G06T 3/4092* (2013.01); *G06F 16/51* (2019.01); *G06T 2200/24* (2013.01); *G06T 2210/32* (2013.01); *G06T 2210/36* (2013.01)

(58) Field of Classification Search

CPC ............. G06T 2200/24; G06T 2210/32; G06T 2210/36; G06T 1/60; G06T 3/4092;
(Continued)

(56) References Cited

U.S. PATENT DOCUMENTS

2015/0124000 A1* 5/2015 Giambalvo ............ G06F 16/44 345/661
2017/0293717 A1* 10/2017 Yu ...................... H04L 67/1095
(Continued)

*Primary Examiner* — Hau H Nguyen
(74) *Attorney, Agent, or Firm* — Sprinkle IP Law Group

(57) ABSTRACT

A digital asset management system is enhanced with an end-to-end deep zoom feature functionality that receives a user request to generate a deep zoom image of an asset, performs an image conversion if necessary, generates the deep zoom image and stores corresponding image folders and files in a transient storage separate from assets managed by the digital asset management system, and cleans up the deep zoom files after a pre-configured time period. The deep zoom image is rendered directly from the transient storage without having to involve the repository, which is separately managed by the digital asset management system. A new Web context is created and provided for viewing the deep zoom image within a browser-based user interface of the digital asset management system for a seamless user experience.

20 Claims, 10 Drawing Sheets

(58) Field of Classification Search
CPC ......... G06F 16/258; G06F 2203/04805; G06F 2203/04806; G06F 2203/04808; G06F 16/9577; H04N 23/69
See application file for complete search history.

(56) References Cited

U.S. PATENT DOCUMENTS

| | | | | |
|---|---|---|---|---|
| 2019/0073510 | A1* | 3/2019 | West | G06F 18/40 |
| 2022/0051364 | A1* | 2/2022 | Kirszenberg | H04N 23/63 |

* cited by examiner

300

500

700

DEEP ZOOM IMAGE GENERATION SYSTEMS AND METHODS WITH TRANSIENT RENDITION STORAGE

CROSS-REFERENCE TO RELATED APPLICATIONS

This application is a continuation of, and claims a benefit of priority under 35 U.S.C. § 120 from, U.S. patent application Ser. No. 17/721,118, filed Apr. 14, 2022, issued as U.S. Pat. No. 12,073,532, entitled "DEEP ZOOM IMAGE GENERATION SYSTEMS AND METHODS WITH TRANSIENT RENDITION STORAGE," the entire contents of which are hereby expressly incorporated by reference herein for all purposes.

TECHNICAL FIELD

This disclosure relates generally to the technical field of image generation. More particularly, this disclosure relates to deep zoom image generation systems, methods, and computer program products, with a filesystem-based transient rendition storage.

BACKGROUND OF THE RELATED ART

Generally, zooming refers to enlarging a view in which details of the view becomes more visible and clear. Zooming has many practical applications, for instance, zooming through a camera lens, zooming an image on the Internet, etc. In some cases, image zooming is a necessary tool to view details of a digital photograph, picture, or image. However, there is a limit as to the degree of image zooming that can be reached with existing image viewing tools and standard image file formats such as TIFF, BMP, JPEG, PNG, GIF, etc. These image file formats are known to those skilled in the art and thus are not further described herein.

Usually, to change the visual appearance of an image in these image file formats, scaling by pixel replication or by interpolation is used. While the quantity of information stored for the image might be increased, the quality of the image generally decreases as the image is zoomed in further.

To this end, new visualization tools and image file formats have been developed particularly for deep zoom. Deep zoom refers to a technology for efficiently transmitting and viewing digital images. Deep zoom uses an extensible markup language (XML) based file format called deep zoom image (DZI) that is quite unlike the standard image file formats.

A DZI has two parts: a DZI file and a directory of image folders. The DZI file has an .dzi or .xml extension and each folder in the image directory is labeled with a corresponding level of resolution. Through a visualization tool that supports the DZI format, a user can specify a single large, high resolution image or a collection of images. Generally, an image is broken into regions or "tiles" and displayed as required. The same image is displayed at each zoom level and follows a quadtree pattern of increasing resolution (e.g., twice the resolution at the second level of zoom). Initially, only the region being viewed or only the image at a particular resolution is downloaded for displaying on a user's device. Subsequently, as the user pans to or zooms in, additional regions are then downloaded.

Today, most existing image viewing tools support standard image file formats. However, not all of them support deep zoom. There are a number of tools that a user can use to convert an image in a standard image file format into a DZI. These tools are mostly command line tools and do not support all of the standard image file formats. Because this image conversion process requires user action and even some programming knowledge (e.g., Java, Linux shell script, etc.), DZI files cannot be generated on demand, for instance, when the user is navigating an image through a digital asset management system. Further, generating and storing DZI files require a huge amount of resources. Depending upon resolution, each DZI file can have hundreds, if not thousands, of tile image files that together represent the overall image. This makes it impractical, and practically impossible, to generate, store, and manage DZI-formatted versions of all assets managed by a digital asset management system.

In view of the foregoing, there is a need for innovations and improvements in deep zoom image generation. This disclosure addresses this need and more.

SUMMARY OF THE DISCLOSURE

An object of this disclosure is to provide a new way of generating deep zoom images from a selection of assets on demand (e.g., via a job) for specific roles in an enterprise computing environment. The deep zoom images thus generated can provide extremely close up image details (e.g., at 1000%). The assets may be managed by any digital asset management system such as an enterprise asset management system, an enterprise media management system, or the like (collectively referred to herein as the "system") hosted on a server machine operating in an enterprise computing environment. The enterprise computing environment can be on the premises of an enterprise or hosted in a cloud computing environment (e.g., as a tenant).

Another object of this disclosure is to provide a deep zoom functionality for native visual review and/or annotations. The deep zoom functionality may be implemented as a tool, a plug-in, a service, a module, or a feature of the system and may be accessible through a user interface of the system. The user interface may be implemented as a web-based user interface running in a computing environment provided by a browser application on a user device communicatively connected to the system over a network.

In some embodiments, a method may comprise receiving, from a user device by a computer implementing a digital asset management system through a browser-based user interface of the digital asset management system on the user device, a request for deep zoom image generation, the request specifying an asset stored in a repository managed by the digital asset management system. The asset may be staged in a deep zoom transient storage. Responsive to the request, a workflow can be initiated to generate a deep zoom image of the asset. In some embodiments, the workflow initiated by the request consists of a single step of deep zoom image generation.

The deep zoom image thus generated has a deep zoom image file and a corresponding directory of image folders and image files. The method may further comprise storing the deep zoom image file and the corresponding directory of image folders and image files in the deep zoom transient storage separate from the repository of the digital asset management system. The storage location information of the deep zoom image file and the corresponding directory of image folders and image files in the deep zoom transient storage is provided to the user device such that the browser-based user interface of the digital asset management system on the user device can render the deep zoom image of the asset from the deep zoom image file and the corresponding directory of image folders and image files in the deep zoom transient storage without involving the repository.

In some embodiments, the method may further comprise determining whether the asset needs a format conversion in order to generate the deep zoom image and responsive to a determination that the format conversion is needed, converting the asset from a first format to a second format.

In some embodiments, the method may comprise determining whether the deep zoom image of the asset already exists in the deep zoom transient storage and responsive to the deep zoom image of the asset already existing in the deep zoom transient storage, having the deep zoom image of the asset rendered directly from the deep zoom transient storage. In some embodiments, the method may comprise determining whether the deep zoom image of the asset already exists in the deep zoom transient storage and responsive to the deep zoom image of the asset not already existing in the deep zoom transient storage, loading a preview of the asset into an asset detail page.

In some embodiments, the method may further comprise creating a Web context for viewing the deep zoom image of the asset through the browser-based user interface of the digital asset management system on the user device.

After a pre-defined, configurable time period, the deep zoom image file and the corresponding directory of image folders and image files are deleted from the deep zoom transient storage so as to avoid having to unnecessarily store a huge of amount of image data. The time period can be configured by an authorized user such as an administrator through an administrative user interface.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. The features illustrated in the drawings are not necessarily drawn to scale.

DETAILED DESCRIPTION

Figure 1:
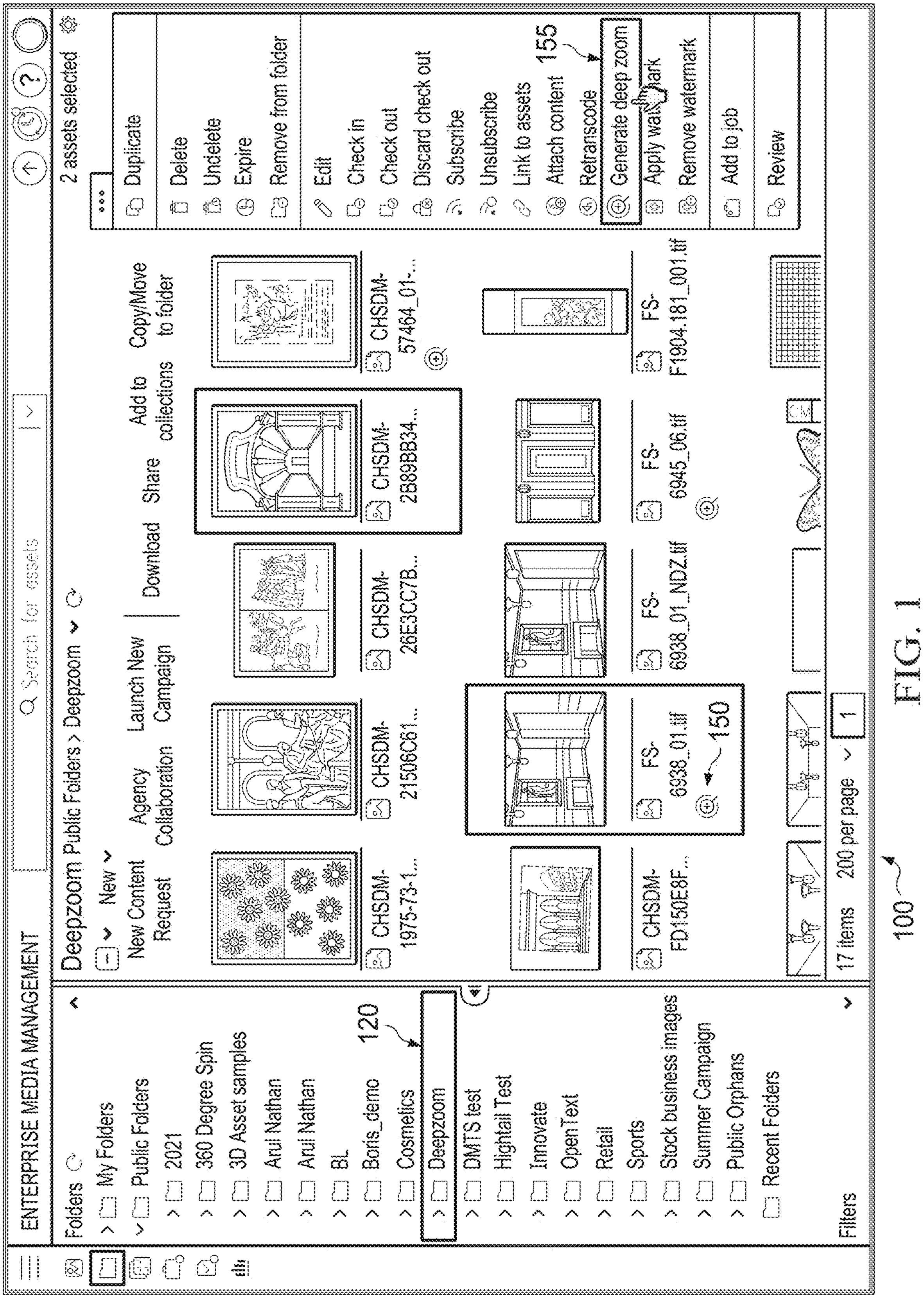
FIG. 1 depicts a diagrammatic representation of a user interface of a digital asset management system implemented with a user interface element that allows a user to initiate deep zoom image generation on demand according to some embodiments disclosed herein.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Conventionally, an asset detail page of a digital asset management system (e.g., an enterprise media management system, an enterprise asset management system, etc.) does not provide a deep zoom option. That is, a user of a conventional digital asset management system generally is unable to view high resolution images up close. To an enterprise, electronic images are considered "managed assets." Typically, a user of the digital asset management system can view an image through an asset preview page. The asset is stored in a standard image format (e.g., .TIF, .TIFF, .JPG, .JPEG, etc.) in a repository managed by the digital asset management system. The asset preview page may only allow enlargement of an image to a certain percentage of zoom (e.g., 200%). The lack of a deep zoom option prevents effective management of deep zoom images. Adding a deep zoom option to a digital asset management system, however, presents technical challenges. For instance, a deep zoom image generation process may produce hundreds, if not thousands, of small image files (e.g., in JPEG format) that together represent the overall picture. This makes it impractical, and practically impossible, for the digital asset management system to generate and store all of the DZI files thus generated. Further, the distinctly different file structure of DZI files also means that DZI files cannot be stored in the repository with other types of managed assets.

The disclosure provides a new approach in which a deep zoom image can be broken up into small segments on the server side and reassembled on the client side. This allows for viewing zoomed-in portions of large file images within a browser-based user interface of the system, while maintaining smooth browser operation (e.g., moving from side to side seamlessly within the browser-based user interface). The new approach disclosed herein includes DZI generation as well as DZI cleanup, providing the system with an end-to-end DZI feature functionality.

In some embodiments, the system may provide various deep zoom image renditions options:

- On the fly—While possible, the amount of time it takes to generate a deep zoom image may affect user experience.
- On Ingest—This option may not affect user experience and thus may perform better than the only the fly option. However, it may cause more than necessary number of deep zoom files being generated because not all assets will be viewed. Therefore, this option may require the use of unnecessary storage.
- On Demand—This is preferred. The system may generate deep zoom images from a selection of assets on demand (via a job) for specific roles. Limit of assets sent to a deep zoom job can be configurable by an administrative user.

In some embodiments, the new approach implemented by the system may comprise the following:

- Generate DZIs from a selection of assets on demand (via a job) for specific roles.
- Limit the number of assets sent to a deep zoom job. This limit (e.g., 25 assets per job) can be configurable by an authorized user such as an administrator.
- Cleanup DZIs within a pre-defined time period. This time period can be defined or otherwise specified by an authorized user such as an administrator (e.g., cleanup a deep zoom image and associated small image files seven days after the last-accessed date).
- Allow users of the system to define deep zoom in their import workflow by adding a Generate deep zoom step.
- Leverage a web-based viewer for high-resolution zoomable images (e.g., OpenSeadragon) to zoom either a deep zooming image or a preview image if a deep zooming image is not available.

Figure 2:
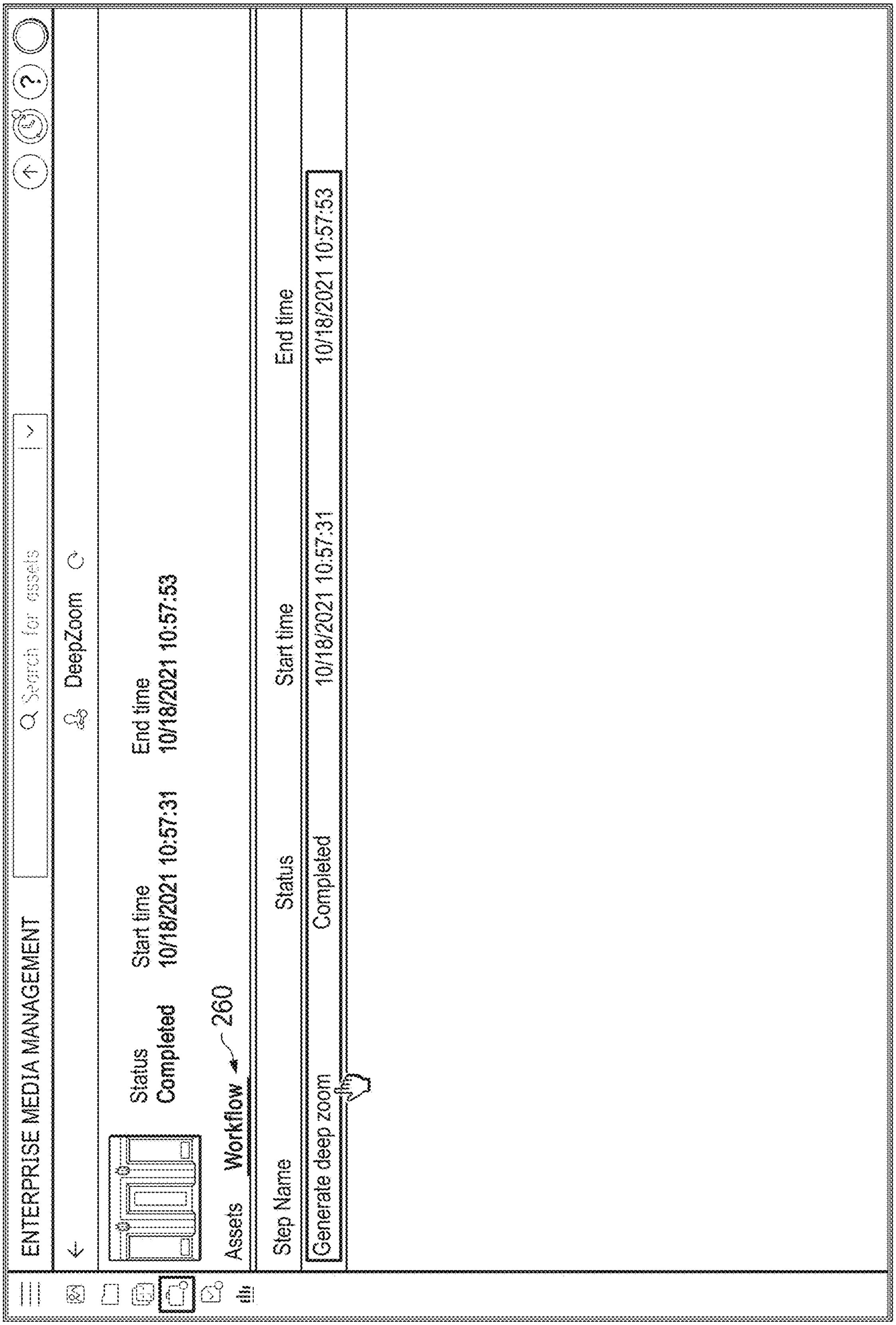
FIG. 2 illustrates an example of a user-initiated one-step workflow to generate a deep zoom image according to some embodiments disclosed herein.

FIG. 1 illustrates an example of a gallery view 100 of managed assets contained in a deepzoom folder 120 within a digital asset management system. A user of the digital asset management system may navigate to this folder in various ways, for instance, through the user interface of the system. In some embodiments, as illustrated in FIG. 1, gallery view 100 may be implemented with a user interface element that indicates assets available for deep zoom viewing, i.e., these assets have associated DZI files. In this example, asset 150 is identified as available for deep zoom viewing. A user can select an image to generate a deep zoom image (e.g., through a pulldown menu option 155) for detailed viewing. The user selection causes the browser to call a server that operates the transformation engine and submit a job. As illustrated in FIG. 2, this job submission initiates a one-step workflow 260 in the system: generate deep zoom which, in turn, makes a request to a digital media transformation service (DMTS) to generate a DZI. This is further described below with reference to FIGS. 6A and 6B.

Figure 3:
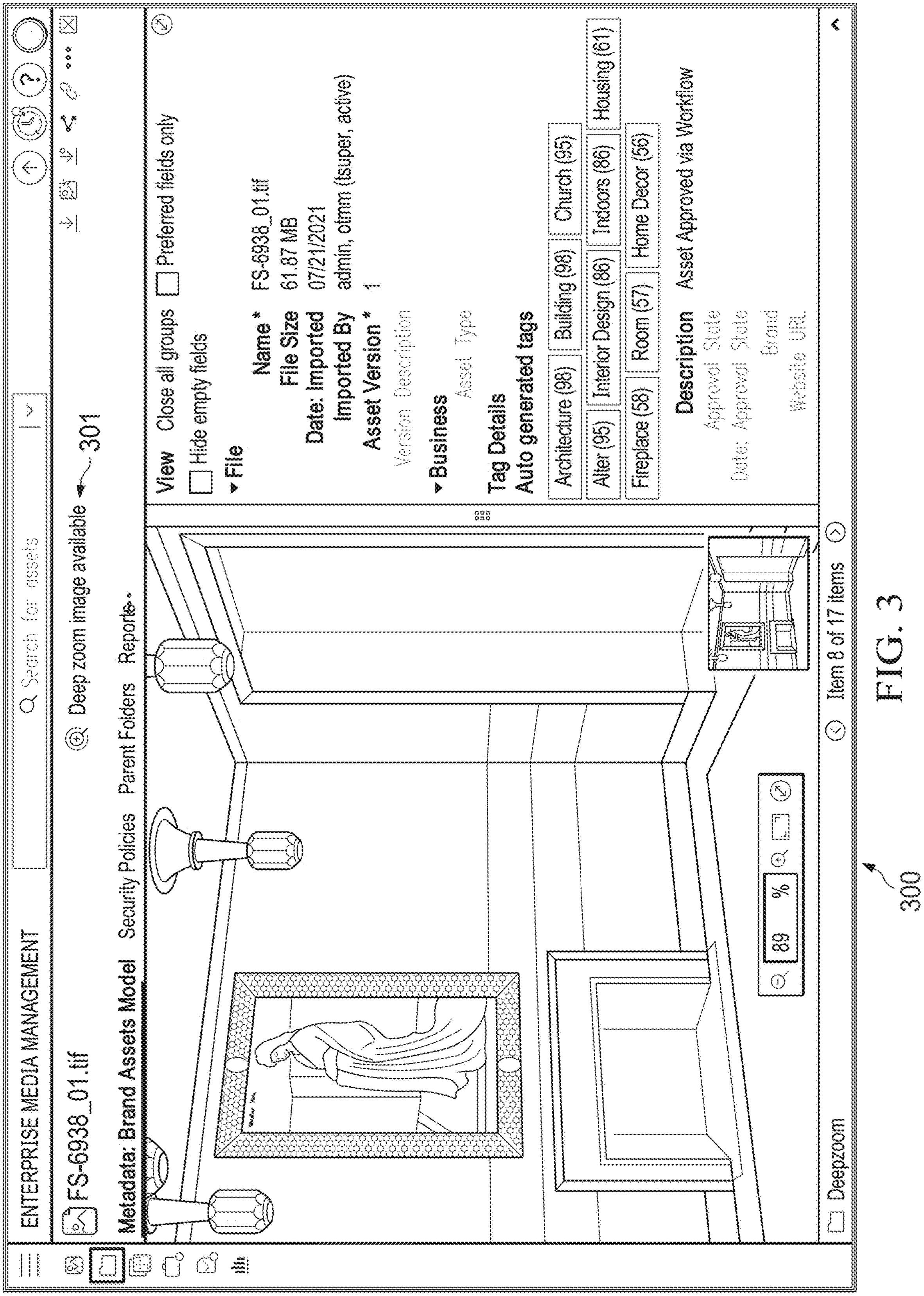
FIG. 3 depicts a diagrammatic representation of a user interface of an enterprise media management system showing a view of an image with image details.

FIG. 3 shows an asset detail page 300 with a user interface element 301 that allows the user to deep zoom the image, for instance, up to 1000%. In some embodiments, when a user selects to preview an asset, if a deep zoom image is available, the system loads the deep zoom image into the asset detail page 300. Otherwise, the system loads the preview of the asset as usual.

Figure 4:
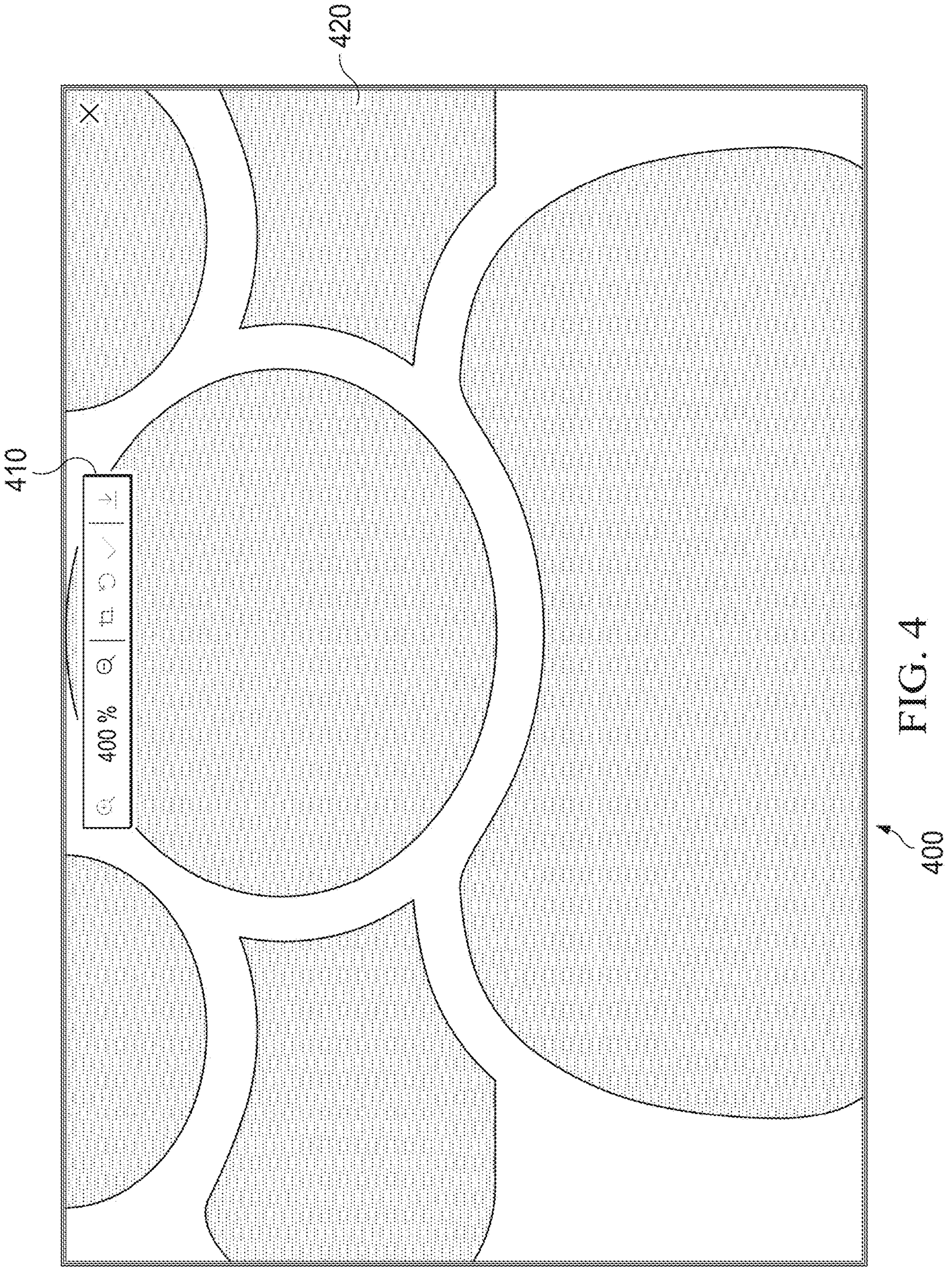
FIG. 4 depicts a diagrammatic representation of a deep zoom image at a user-specified resolution level.

FIG. 4 illustrates an example of a deep zoom image 400. In some embodiments, the user can adjust, via a popup menu 410, the level of deep zoom and corresponding resolution while in the deep zoom viewing mode.

Figure 5:
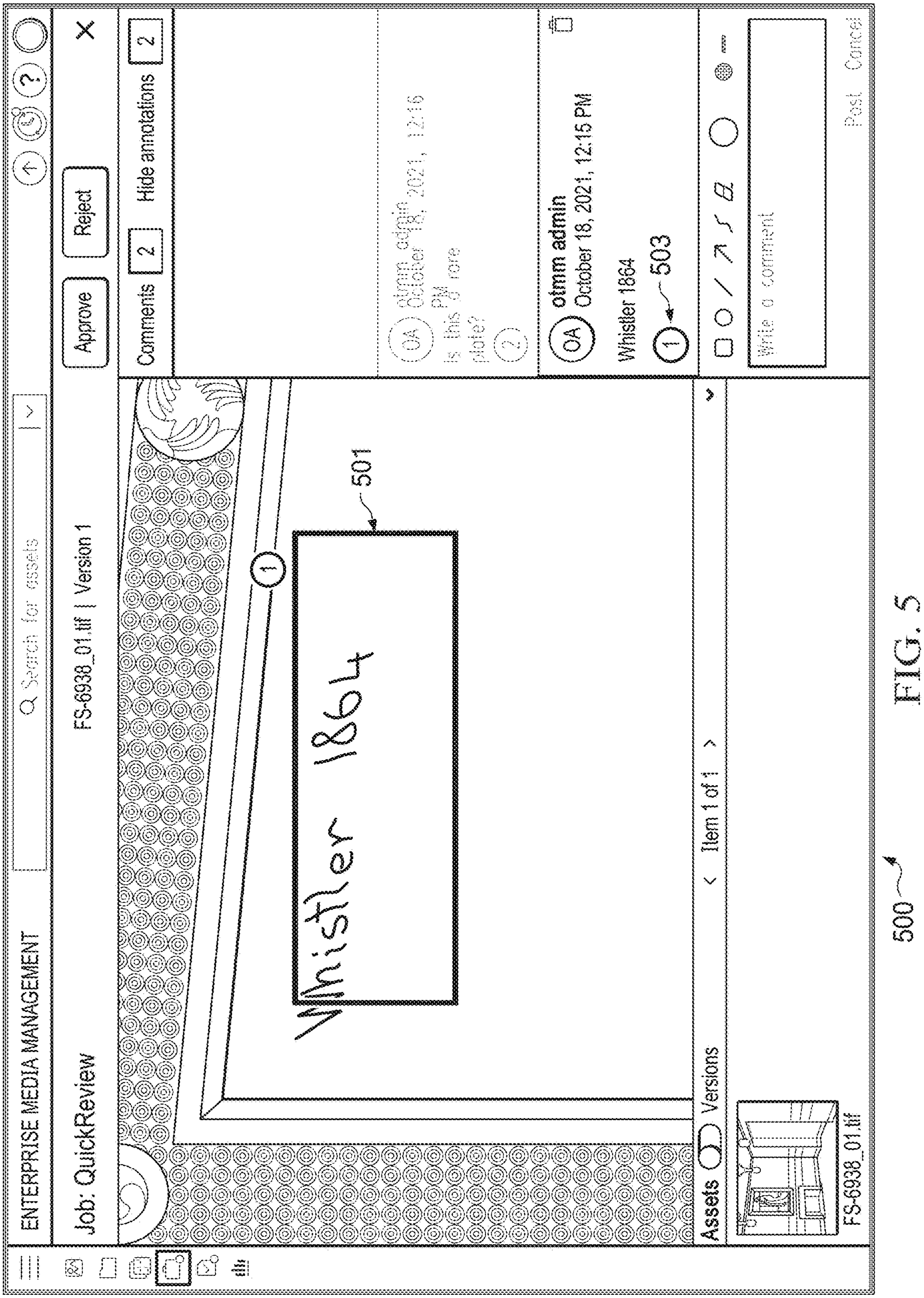
FIG. 5 depicts a diagrammatic representation of a user interface of an enterprise media management system implemented with a user interface element that allows a user to annotate or comment on a portion of an image through a deep zoom view according to some embodiments disclosed herein.

Through the user interface of the system, the user can also annotate or comment on the asset while in the deep zoom viewing mode. This is illustrated in FIG. 5. In this example, an area 501 is marked (using an appropriate marking or highlighting tool) and a comments section 503 provides a user input field for commenting on area 501. The system stores such comments as metadata associated with the asset.

Figure 6A:
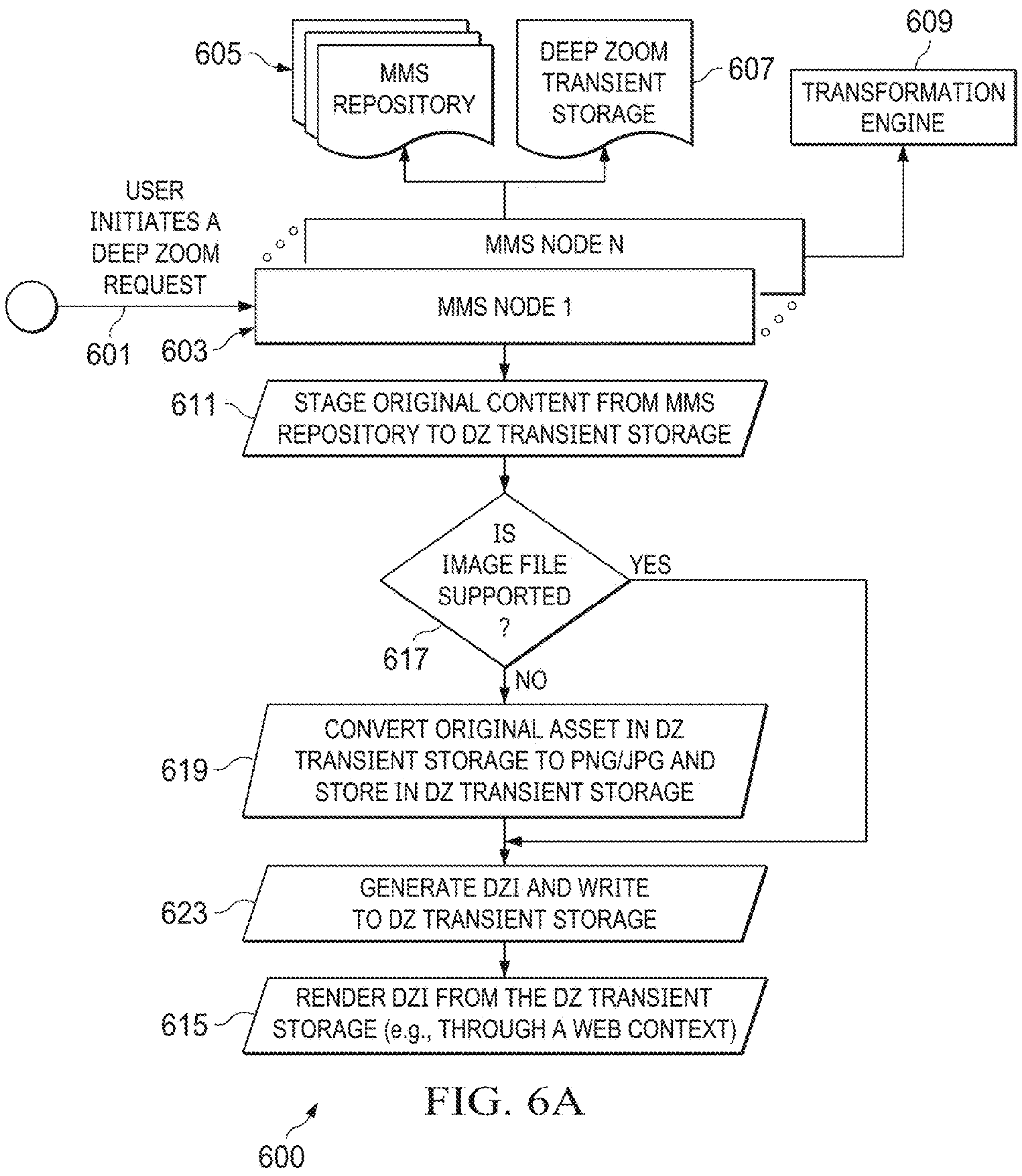
FIGS. 6A and 6B are flow diagrams that illustrate examples of a process flow for generating a deep zoom image on demand in response to a user-initiated request according to some embodiments disclosed herein.
Figure 6B:
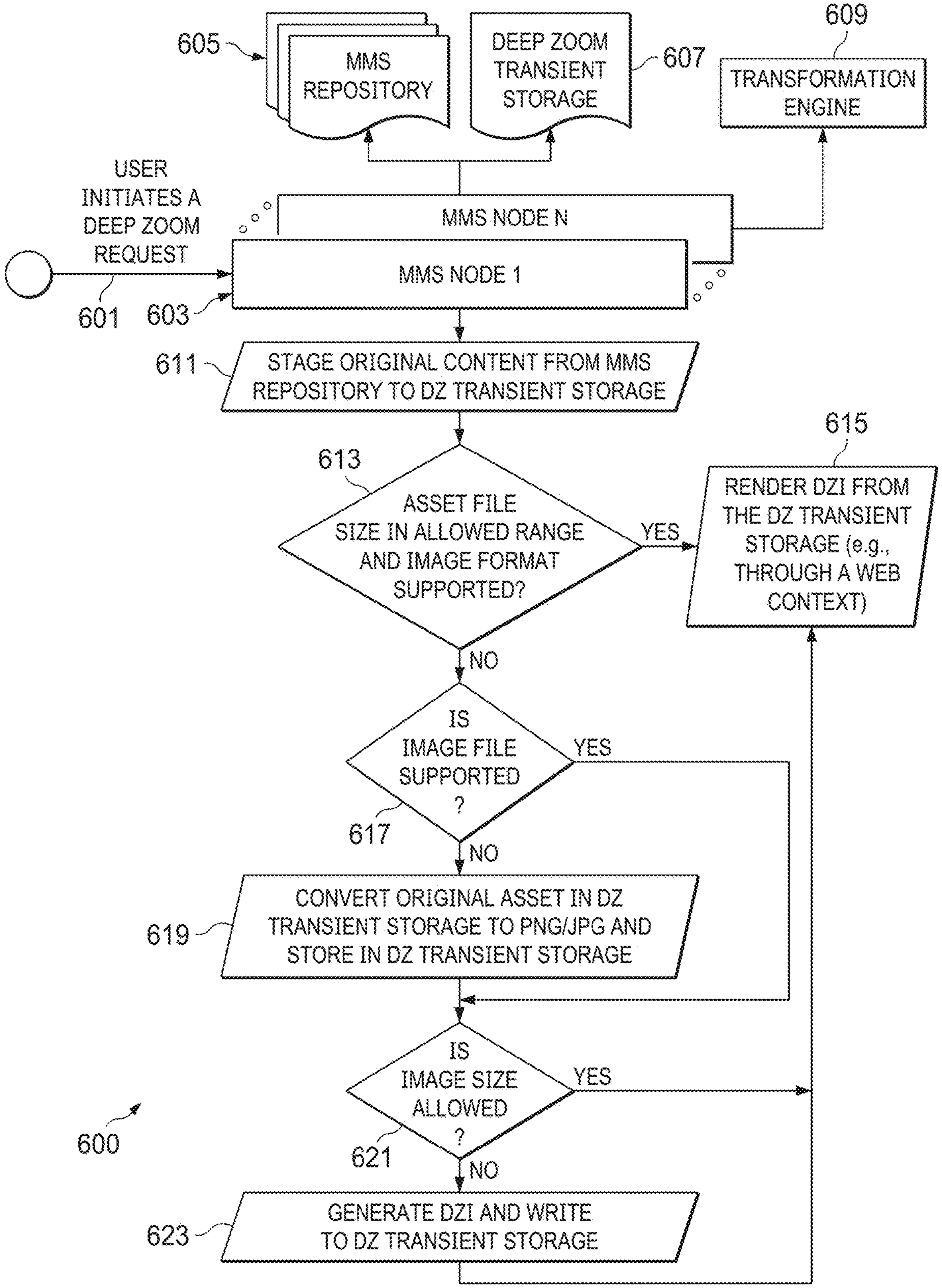

FIGS. 6A and 6B are flow diagrams that illustrate examples of how the system enables a user to initiate a deep zoom request to generate a deep zoom image in the DZI format. As discussed above, the user may navigate to a gallery view or detailed action page of an asset through a user interface that implements an image tool with the deep zoom functionality disclosed herein. As a non-limiting example, the system can be implemented as a media management system (MMS) hosted on a server machine operating in an enterprise computing environment and providing a user interface through a browser running on the user device. The system can include a MMS repository 605 configured for storing digital assets managed by the system.

In some embodiments, process 600 can be initiated when a user requests generation of a deep zoom image (see e.g., FIG. 1) (601). The request is received by the system (603) and triggers a one-step workflow for DZI generation (see e.g., FIG. 2). The DZI generation step, in turn, calls a digital media transformation service (DMTS) provided by a transformation engine of the system (609). In response, the DMTS stages the original content (e.g., a high resolution image file) from the MMS repository to a deep zoom transient storage (611). In some embodiments, certain initial checks may be performed, for instance, to determine whether the asset file size is in an allowed range (see e.g., FIG. 6B) (613) and whether the image format is supported (617).

As discussed above, a DZI has two parts: an XML-based DZI file and a directory of image folders. The XML-based DZI file relies on a hierarchy to reference image files (e.g., tiles) in the image folders. This makes DZI files unsuitable for the MMS repository, which maintains its own repository structure for permanent storage of managed assets. Accordingly, DZI files and corresponding directories and image files thus generated are stored in a temporary area (e.g., deep zoom transient storage 607) for a period of time (e.g., 30 days), separate from the managed assets stored in the MMS repository. The deep zoom transient storage can be a file system-based, time-bound temporary storage in the system.

In some embodiments, the system may leverage a libvips library, which creates the DZI format, to implement the end-to-end DZI feature functionality within the system. This library may be embedded in the transformation engine of the system. The end-to-end DZI feature functionality can be implemented as a deep zoom operation that is part of the DMTS provided by the transformation engine. The DMTS is configured for handling all the digital media transformation operations, including image transformations, video transformations, metadata extraction, etc., within the system. The DZI format and the libvips library are known to those skilled in the art and thus are not further described herein. Other libraries may also be used. Existing image viewing tools that use such a library to allow a user to convert an image from a standard image file format into a DZI do not provide an end-to-end DZI feature functionality.

For example, the request to generate a DZI may specify a high resolution image in a format that is not supported by the libvips library. In this case, the DMTS is operable to determine that the high resolution image specified in the request is not supported by the libvips library (617) and automatically perform an image conversion to convert the high resolution image from an unsupported format to a format support by the libvips library (619). In some embodiments, the DMTS may perform a final check on the size of the DZI (see e.g., FIG. 6B) (621). The DMTS may use the libvips library to generate the DZI file and corresponding image folders and image files (623). The DMTS writes them to the deep zoom transient storage and sends the storage location information to the browser-based user interface which, in turn, renders the DZI from the deep zoom transient storage (615). If a DZI had already been generated for the requested image, the DZI may be rendered directly from the deep zoom transient storage.

As discussed above, the MMS repository has its own repository structure, so the DZI cannot be directly rendered from the MMS repository (e.g., by making an application programming interface (API) call). Therefore, for viewing purposes, a new Web context (e.g., deepzoom.war) is created in the system, with a session check filter based on the security session. This Web context allows the browser-based user interface of the system to directly render the DZI files from the deep zoom transient storage for a seamless user experience. Viewing of managed assets stored in the MMS repository is done through a different context via an API layer.

Below are sample deep zoom requests for different image formats.

Sample deep zoom request (JPEG):

```
{
  "sourceFile": {
    "filename": "xbox.png",
    "downloadUrl": "DeepZoom/xbox.png"
  },
  "operationParams": [{
    "type":"deep_zoom",
    "tag": "deepzoom_tag",
    "encodeParams": {
      "encodeType":"jpg",
      "quality":90
    }
  }],
  "callbackUrl": "{{CallbackUrl}}",
  "externalId": "external_id_1",
  "uploadUrl": "DeepZoom"
}
```

Sample deep zoom request (PNG):

```
{
  "sourceFile": {
    "filename": "xbox.png",
    "downloadUrl": "DeepZoom/xbox.png"
  },
  "operationParams": [{
    "type":"deep_zoom",
```

-continued

Sample deep zoom request (PNG):

```
    "tag": "deepzoom_tag",
    "encodeParams": {
      "encodeType":"png"
    }
  }],
  "callbackUrl": "{{CallbackUrl}}",
  "externalId": "external_id_1",
  "uploadUrl": "DeepZoom"
}
```

Once the deep zoom image is generated, the system may send a response as exemplified below:

Sample deep zoom response:

```
{
  "status" : {
    "code" : "Completed",
    "message" : "Transformation(s) completed."
  },
  "jobId" : "f8ff0a3e-e82c-48f8-bf18-e407ea685c72",
  "externalId" : "external_id_1",
  "operationResults" : [ {
    "status" : "Ok",
    "message" : "The job was completed successfully",
    "type" : "deep_zoom",
    "tag" : "deepzoom_tag",
    "renditions" : [ {
      "href" : "DeepZoom/88ecc90f-9346-4fd2-9702-
      15f1e8a4be23.dzi"
    },
    {
      "href" : "DeepZoom/88ecc90f-9346-4fd2-9702-
      15f1e8a4be23_files"
    } ]
  } ]
}
```

Figure 7:
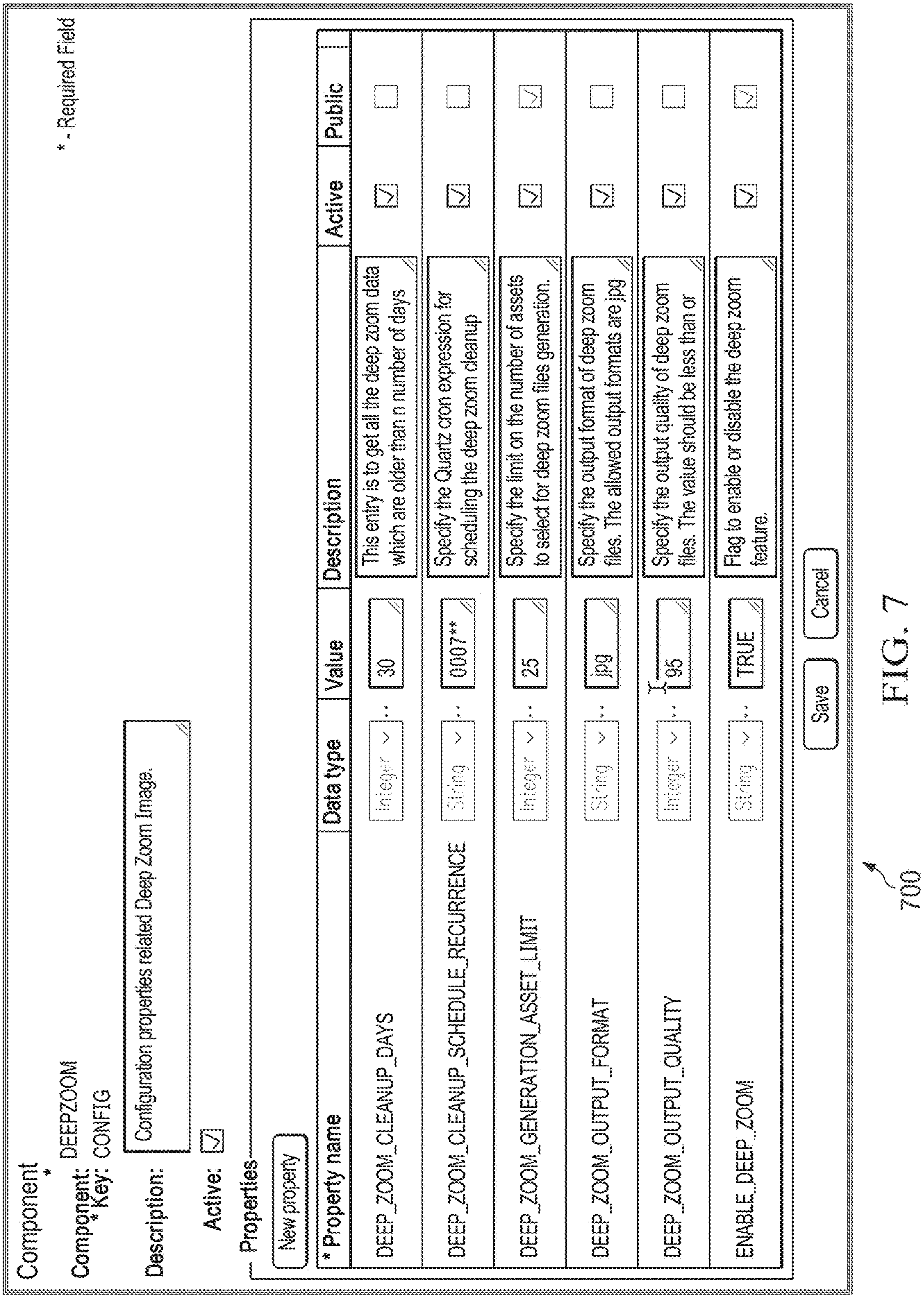
FIG. 7 depicts a diagrammatic representation of a user interface that illustrates components of a DZI file according to some embodiments disclosed herein.

FIG. 7 shows a component page 700 of a DZI file. In this example, component page 700 illustrates example properties of an asset in DZI format, including clean up information. In some embodiments, each DZI file is timestamped. In some embodiments, timestamp information can be saved in a database table. In some embodiments, the system may cleanup DZI files (e.g., in network folder 220) after a configured number of days of no access (e.g., 7 days). An existing cleanup framework may be used by the system to clean up the files.

As a non-limiting example, a cleanup task can check whether the deep zoom content's last accessed time is older than the configured number of days. If yes, it cleans the content from the deep zoom storage location. There is a system setting DEEP_ZOOM_CLEANUP_DAYS where an authorized user can configure a number of days for cleaning. The default value is 30 days.

In some embodiments, a servlet class in the deepzoom.war reads the path information from a user's deep zoom request, appends the path information to the root directory of the deep zoom transient storage location, and constructs the actual location of the file. Finally, it reads the content from the transient storage location and writes to the repository's output stream.

In some embodiments, prior to processing the request, a session check filter will check the presence of the security session that is passed in the request. The request is failed if session details are not passed in the request or if given details are invalid.

Figure 8:
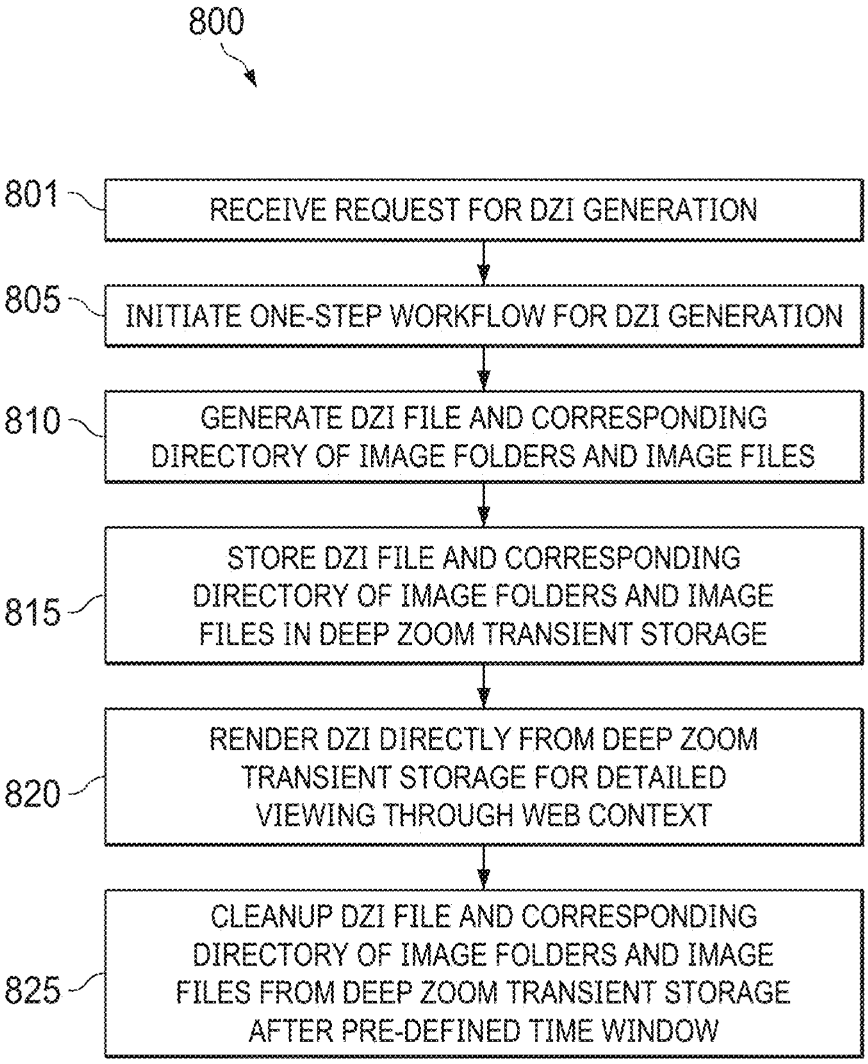
FIG. 8 is a flow chart that illustrates a process of an end-to-end deep zoom image generation, viewing, and cleanup according to some embodiments disclosed herein.

FIG. 8 is a flow chart that illustrates a process of an end-to-end deep zoom image generation, viewing, and cleanup. As discussed above, a user may send a request for DZI generation through a browser-based user interface of a digital asset management system (801). The request may specify a high resolution image stored in a repository managed by the digital asset management system. The request may cause a job submission to a DMTS provided by a transformation engine of the digital asset management system.

The job submission initiates a one-step workflow to generate a DZI (805). In response, the transformation engine generates a DZI file and a corresponding directory of image folders and image files (810) and stores them in a deep zoom transient storage of the digital asset management system (815).

Due to storage requirements and structural differences, the DZI file and the corresponding directory of image folders and image files are not suitable for storing with the original high resolution image in the repository. Because the DZI file and the corresponding directory of image folders and image files are not stored and managed in the repository, the DZI cannot be rendered from the repository via an API call. Thus, the DZI file is rendered directly from the deep zoom transient storage and viewed through a Web context particularly created for the DZI (820).

The DZI file is timestamped and the system runs a cleanup operation on the deep zoom transient storage periodically. Because not every user of the digital asset management system may view every one of the managed assets stored in the repository, there is no need to permanently keep deep zoom files and corresponding image folders and image files. Accordingly, after a pre-defined time window (e.g., 30 days from the last-accessed date, the last-modified date, etc.), the DZI file and the corresponding directory of image folders and image files are deleted from the deep zoom transient storage (825).

Figure 9:
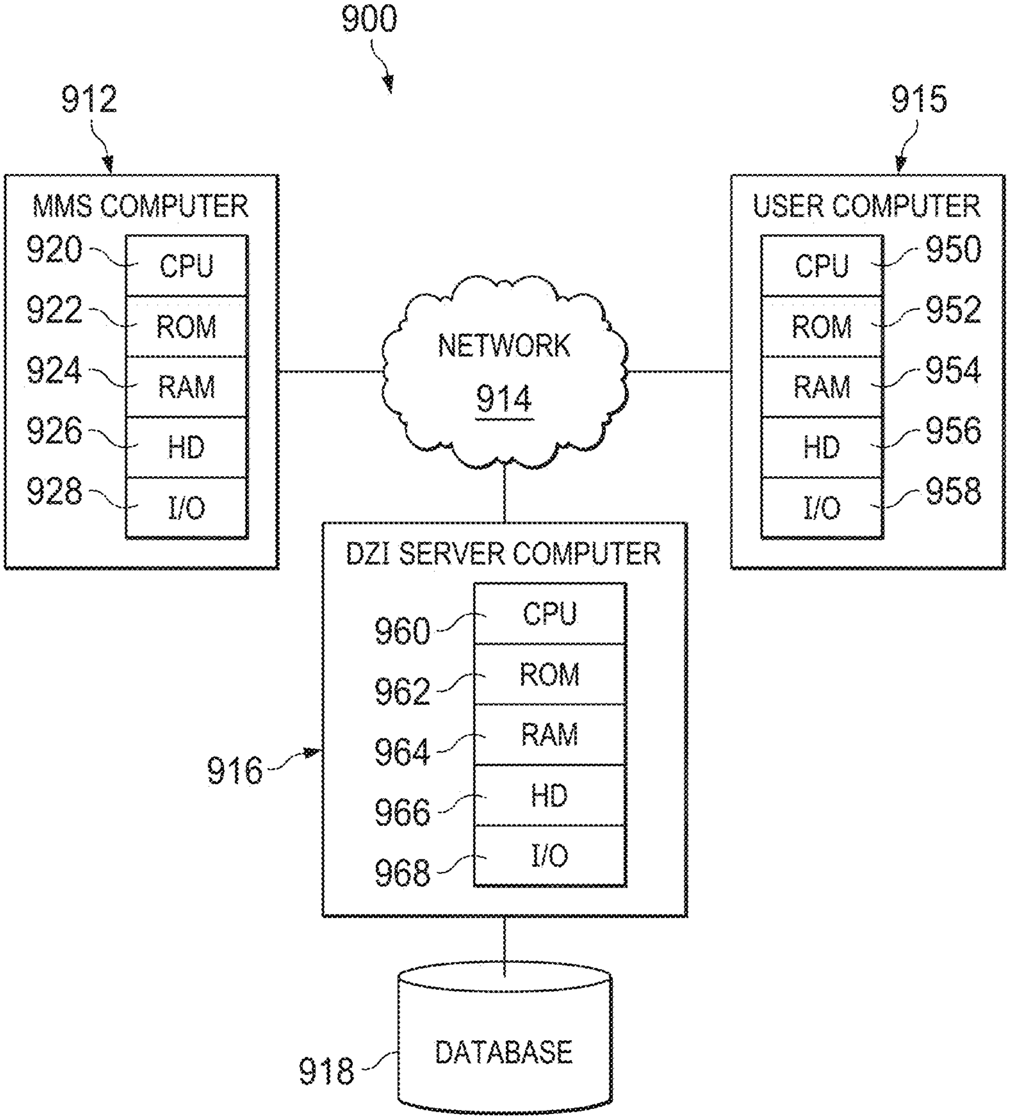
FIG. 9 depicts a diagrammatic representation of a distributed network computing environment where embodiments disclosed can be implemented.

FIG. 9 depicts a diagrammatic representation of a distributed network computing environment where embodiments disclosed can be implemented. In the example illustrated, network computing environment 900 includes network 914 that can be bi-directionally coupled to a media management system (MMS) computer 912, a user computer 915, and a DZI server computer 916. Computer 916 can be bi-directionally coupled to data store 918. Network 914 may represent a combination of wired and wireless networks that network computing environment 900 may utilize for various types of network communications known to those skilled in the art.

For the purpose of illustration, a single system is shown for each of computer 912, computer 915, and computer 916. However, with each of computer 912, computer 915, and computer 916, a plurality of computers (not shown) may be interconnected to each other over network 914. For example, a plurality of computers 912 and a plurality of computers 915 may be coupled to network 914. Computers 915 may include data processing systems for communicating with computer 912 and computer 916. Computers 915 may include data processing systems (e.g., workstations running a frontend user interface of MMS) for users whose jobs may require them to view, edit, and/or comments enterprise assets in network computing environment 900.

Computer 912 can include central processing unit ("CPU") 920, read-only memory ("ROM") 922, random access memory ("RAM") 924, hard drive ("HD") or storage memory 926, and input/output device(s) ("I/O") 928. I/O 928 can include a keyboard, monitor, printer, electronic pointing device (e.g., mouse, trackball, stylus, etc.), or the like. Computer 912 can include a desktop computer, a laptop computer, a personal digital assistant, a cellular phone, or nearly any device capable of communicating over a network. Computer 915 may be similar to computer 912 and can comprise CPU 950, ROM 952, RAM 954, HD 956, and I/O 958.

Likewise, computer 916 may include CPU 960, ROM 962, RAM 964, HD 966, and I/O 968. Computer 916 may include one or more backend systems configured for providing content Web services (CWS) over network 914. In some embodiments, activity flow information may be stored in data store or database 918. Many other alternative configurations are possible and known to skilled artisans.

Each of the computers in FIG. 9 may have more than one CPU, ROM, RAM, HD, I/O, or other hardware components. For the sake of brevity, each computer is illustrated as having one of each of the hardware components, even if more than one is used. Each of computers 912, 915, and 916 is an example of a data processing system. ROM 922, 952, and 962; RAM 924, 954, and 964; HD 926, 956, and 966; and data store 918 can include media that can be read by CPU 920, 950, or 960. Therefore, these types of memories include non-transitory computer-readable storage media. These memories may be internal or external to computers 912, 915, or 916.

Portions of the methods described herein may be implemented in suitable software code that may reside within ROM 922, 952, or 962; RAM 924, 954, or 964; or HD 926, 956, or 966. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively or additionally, the computer-executable instructions may be stored as software code components on a direct access storage device array, magnetic tape, floppy diskette, optical storage device, or other appropriate computer-readable medium or storage device.

Any suitable programming language can be used to implement the routines, methods, or programs of embodiments of the invention described herein, including C, C++, Java, JavaScript, HyperText Markup Language (HTML), Python, or any other programming or scripting code. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved in many ways. For example, distributed or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms “comprises,” “comprising,” “includes,” “including,” “has,” “having,” or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term “or” as used herein is generally intended to mean “and/or” unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by “a” or “an” (and “the” when antecedent basis is “a” or “an”) includes both singular and plural of such term, unless clearly indicated within the claim otherwise (i.e., that the reference “a” or “an” clearly indicates only the singular or only the plural). Also, as used in the description herein and throughout the claims that follow, the meaning of “in” includes “in” and “on” unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the disclosure should be determined by the following claims and their legal equivalents.

What is claimed is:

1. A method, comprising:

at an asset management system having a processor and a non-transitory computer-readable medium and responsive to a request from a user device for a deep zoom image of an asset managed by the asset management system:

staging the asset in a time-bound transient storage that is bound to a time period;

generating a deep zoom image file for the asset and a corresponding directory of image folders and image files for the asset;

storing the deep zoom image file and the corresponding directory of image folders and image files in the time-bound transient storage;

presenting, through a user interface on the user device, the deep zoom image of the asset using the deep zoom image file and the corresponding directory of image folders and image files in the time-bound transient storage; and deleting the deep zoom image file and the corresponding directory of image folders and image files from the time-bound transient storage after the time period, to which the time-bound transient storage is bound, expires.

2. The method according to claim 1, wherein the asset is stored in a repository managed by the asset management system and wherein the asset comprises a high resolution image file.

3. The method according to claim 2, wherein the repository maintains a structure for permanent storage of managed assets, wherein the deep zoom image file for the asset comprises an extensible markup language (XML)-based file that relies on a hierarchy to reference the image files in the image folders, and wherein the structure of the repository is unsuitable for referencing the image files in the image folders according to the hierarchy.

4. The method according to claim 1, further comprising:

determining whether the deep zoom image of the asset is in the time-bound transient storage;

responsive to the deep zoom image of the asset being in the time-bound transient storage, having the deep zoom image of the asset rendered directly from the time-bound transient storage; and responsive to the deep zoom image of the asset not being in the time-bound transient storage, loading a preview of the asset staged in the time-bound transient storage through the user interface.

5. The method according to claim 4, further comprising:

creating a Web context for the preview of the asset staged in the time-bound transient storage through the user interface.

6. The method according to claim 1, wherein the generating comprises determining whether a file size of the asset is within an allowed range and whether a file format of the asset is acceptable and wherein the presenting the deep zoom image of the asset is performed responsive to the file size of the asset being within the allowed range and the file format of the asset being acceptable.

7. The method according to claim 6, further comprising:

responsive to the file format of the asset being unacceptable, converting the asset staged in the time-bound transient storage to an acceptable file format.

8. An asset management system, comprising:

a processor;

a non-transitory computer-readable medium; and instructions stored on the non-transitory computer-readable medium and translatable by the processor for, responsive to a request from a user device for a deep zoom image of an asset managed by the asset management system, performing:

staging the asset in a time-bound transient storage that is bound to a time period;

generating a deep zoom image file for the asset and a corresponding directory of image folders and image files for the asset;

storing the deep zoom image file and the corresponding directory of image folders and image files in the time-bound transient storage;

presenting, through a user interface on the user device, the deep zoom image of the asset using the deep zoom image file and the corresponding directory of image folders and image files in the time-bound transient storage; and deleting the deep zoom image file and the corresponding directory of image folders and image files from the time-bound transient storage after the time period, to which the time-bound transient storage is bound, expires.

9. The asset management system of claim 8, wherein the asset is stored in a repository managed by the asset management system and wherein the asset comprises a high resolution image file.

10. The asset management system of claim 9, wherein the repository maintains a structure for permanent storage of managed assets, wherein the deep zoom image file for the asset comprises an extensible markup language (XML)-based file that relies on a hierarchy to reference the image files in the image folders, and wherein the structure of the repository is unsuitable for referencing the image files in the image folders according to the hierarchy.

11. The asset management system of claim 8, wherein the instructions are further translatable by the processor for:

determining whether the deep zoom image of the asset is in the time-bound transient storage;

responsive to the deep zoom image of the asset being in the time-bound transient storage, having the deep zoom image of the asset rendered directly from the time-bound transient storage; and responsive to the deep zoom image of the asset not being in the time-bound transient storage, loading a preview of the asset staged in the time-bound transient storage through the user interface.

12. The asset management system of claim 11, wherein the instructions are further translatable by the processor for:

creating a Web context for the preview of the asset staged in the time-bound transient storage through the user interface.

13. The asset management system of claim 8, wherein the generating comprises determining whether a file size of the asset is within an allowed range and whether a file format of the asset is acceptable and wherein the presenting the deep zoom image of the asset is performed responsive to the file size of the asset being within the allowed range and the file format of the asset being acceptable.

14. The asset management system of claim 13, wherein the instructions are further translatable by the processor for:

responsive to the file format of the asset being unacceptable, converting the asset staged in the time-bound transient storage to an acceptable file format.

15. A computer program product comprising a non-transitory computer-readable medium storing instructions translatable by a processor of an asset management system for, responsive to a request from a user device for a deep zoom image of an asset managed by the asset management system, performing:

staging the asset in a time-bound transient storage that is bound to a time period;

generating a deep zoom image file for the asset and a corresponding directory of image folders and image files for the asset;

storing the deep zoom image file and the corresponding directory of image folders and image files in the time-bound transient storage;

presenting, through a user interface on the user device, the deep zoom image of the asset using the deep zoom image file and the corresponding directory of image folders and image files in the time-bound transient storage; and deleting the deep zoom image file and the corresponding directory of image folders and image files from the time-bound transient storage after the time period, to which the time-bound transient storage is bound, expires.

16. The computer program product of claim 15, wherein the asset is stored in a repository managed by the asset management system and wherein the asset comprises a high resolution image file.

17. The computer program product of claim 16, wherein the repository maintains a structure for permanent storage of managed assets, wherein the deep zoom image file for the asset comprises an extensible markup language (XML)-based file that relies on a hierarchy to reference the image files in the image folders, and wherein the structure of the repository is unsuitable for referencing the image files in the image folders according to the hierarchy.

18. The computer program product of claim 15, wherein the instructions are further translatable by the processor for:

determining whether the deep zoom image of the asset is in the time-bound transient storage;

responsive to the deep zoom image of the asset being in the time-bound transient storage, having the deep zoom image of the asset rendered directly from the time-bound transient storage; and responsive to the deep zoom image of the asset not being in the time-bound transient storage, loading a preview of the asset staged in the time-bound transient storage through the user interface.

19. The computer program product of claim 18, wherein the instructions are further translatable by the processor for:

creating a Web context for the preview of the asset staged in the time-bound transient storage through the user interface.

20. The computer program product of claim 15, wherein the generating comprises determining whether a file size of the asset is within an allowed range and whether a file format of the asset is acceptable, wherein the presenting the deep zoom image of the asset is performed responsive to the file size of the asset being within the allowed range and the file format of the asset being acceptable, and wherein the instructions are further translatable by the processor for, responsive to the file format of the asset being unacceptable, converting the asset staged in the time-bound transient storage to an acceptable file format.

* * * * *